Jan. 20, 1970 F. C. DOUGHTY 3,491,346

TRANSFORMER-COUPLED STORAGE APPARATUS

Original Filed Feb. 14, 1964 3 Sheets-Sheet 1

INVENTOR.
FREDERIC C. DOUGHTY

Jan. 20, 1970 F. C. DOUGHTY 3,491,346

TRANSFORMER-COUPLED STORAGE APPARATUS

Original Filed Feb. 14, 1964 3 Sheets-Sheet 2

INVENTOR.
FREDERIC C. DOUGHTY

TRANSFORMER-COUPLED STORAGE APPARATUS

Original Filed Feb. 14, 1964

INVENTOR.
FREDERIC C. DOUGHTY 3,491,346
TRANSFORMER-COUPLED STORAGE APPARATUS

Frederic C. Doughty, Tredyffrin Township, Pa., assignor to Burroughs Corporation, Detroit, Mich., a corporation of Michigan Original application Feb. 14, 1964, Ser. No. 344,877, now Patent No. 3,446,983, dated May 27, 1969. Divided and this application Sept. 16, 1968, Ser. No. 762,302
Int. Cl. G11b 5/00
U.S. Cl. 340—174 10 Claims

ABSTRACT OF THE DISCLOSURE

Various transformer coupling configurations for electric signal storage apparatus are disclosed which incorporate plural primary or secondary windings for efficiently interconnecting plural storage elements or storage planes in parallel to write or read means in noise-cancelling relationship.

This is a division of application Ser. No. 344,877, filed Feb. 14, 1964, now Patent No. 3,446,983. This invention relates to electrical coupling devices and more particularly relates to a system for coupling a plurality of individual electrical or electronic units to a single utility device.

It is frequently desirable to connect a plurality of units to one input or output circuit. Such an interconnection may be a parallel or a series circuit, each having advantages and each having disadvantages. In deciding on the type of interconnection, special consideration is given to the efficiency with which power may be transmitted through the system with each possible connection and to the effect of the connection on the amount of coupling between units of the system and between units of the system and external sources of energy.

The plurality of units may be located with respect to each other or with respect to another system in such a way that noise is introduced into the units through the intercoupling between themselves or between themselves and the other system. It has been found that some of this noise can be cancelled by arranging the plurality of units so that the noise is induced with one polarity in part of a closed loop and with the opposite polarity in some other part of the closed loop.

If the plurality of units are connected in series, an adjustment must be made on the entire series combination so that the noise introduced into the series circuit of one polarity may be cancelled by the noise of the other polarity. It is difficult to make this adjustment for a large number of units in series since the noise induced in each unit is conducted through other units. Also, if one of the series units is removed and another substituted for it, the entire circuit must be readjusted to equalize the noise. On the other hand, parallel connection of the plurality of units may permit each individual unit to be separately adjusted so that the noise is reduced by cancellation within an internal loop.

Besides considering the effect of intercoupling between the units when selecting the form of connection to an input or an output circuit, it is necessary to consider the efficiency of the connection with respect to the power transmission between the units and the output or input circuit. For example, if each of the units functions as a generator and the output circuit is a load, it is desirable for the impedance of the load to be approximately equal to the combined impedance of the units to obtain efficient power transfer. Consequently, if the internal impedances of the individual units are very low as compared to the impedance of the load, it is desirable to connect the units in series since their impedance will be additive. On the other hand, if the internal impedances of the units are very high as compared to the load, it is desirable to connect the individual units in parallel.

It may be desirable, for example, to interconnect a plurality of low internal impedance generators to a load with a minimum coupling to other systems. Such a condition exists in a ferromagnetic thin-film memory.

In a magnetic thin-film memory, storage elements are arranged on rectangular planar arrays. A number of arrays comprise a memory stack. A plurality of storage elements are associated to each other as rows and columns of elements within each plane. A read line which may be a two-wire transmission line, is associated with one row of storage elements on a plane and comprises a unit. A number of units, each on a different plane, may be electrically connected to one sensing amplifier to obtain an indication of the switching of any one memory element. In such a system the write line may also be associated with each row of memory elements so as to be parallel to the read lines. The current flowing through the write lines introduces noise in the read lines. However, this noise may be cancelled if the read lines are transposed in location with the write lines so that the noise introduced in half of each read line opposes and cancels the noise introduced in the other half of each read line.

If the read lines are connected in series, it is difficult to adjust them to attain this equalized condition. Also, if it were required to replace one unit, the new series combination would have to be readjusted. Moreover, if connections between the read lines and the write lines are in close proximity to each other on each side of the memory, additional noise is introduced in the connectors. Accordingly, it is an object of this invention to provide an improved coupling device for electrically connecting the plurality of units to one output or input circuit.

It is another object of this invention to provide a system for electrically connecting a plurality of units to a single input or output circuit to provide efficient power transmission between the individual units and the input or output circuit and at the same time to provide space isolation of the wiring of a plurality of units so that each unit may be adjusted individually.

It is a further object of this invention to provide a system for physically coupling a plurality of units in parallel while at the same time electrically connecting the same plurality of units in series with an input or an output circuit.

It is a still further object of this invention to provide a system of parallel circuits in which each of the parallel circuits may be individually adjusted so that noise introduced into the circuit is self-cancelling.

It is a still further object of this invention to provide a transformer coupling system for a read line in a thin film memory, which system permits the connectors to the read lines to be one one side of the memory stack and the conductors for the write lines to be on the other side of the memory stack and which system permits the substitution of storage units without loss in noise cancelling characteristics.

In accordance with the above objects a coupling system for connecting a plurality of low-impedance units to an input or output circuit while allowing the units to be individually adjusted for noise cancellation is provided; the coupling system may be used in a thin film memory in which each of the units (read lines) are terminated on one side of the memory planes and connected to a primary winding of a different transformer at the other end of the plane. Each of these read lines is transposed with respect to the write lines so that half of its length is on one side of a write line and the other half of its length is on the opposite side of the write line. This causes the voltage induced in each read line from a write line to be near self-cancelling. Each of the read lines is individually adjustable on one end with respect to the corresponding write line permitting complete cancellation of the noise introduced in it by current flowing through the write line.

The secondary windings of the transformers to which all of the read lines are connected in series to each other and to a sense amplifier. The write lines may be connected in a similar manner so that the connectors for the read-out lines will all be on one side of a memory stack and the connectors for the write lines will be on the opposite side of the memory stack. Since the read circuits are individually tuned, a memory plane may be removed and another one (previously adjusted) substituted for it without disturbing the noise condition of the memory stack.

The invention and the above-noted and other features thereof will be understood more clearly and fully from the following detailed description with reference to the accompanying drawings in which.

Figure 1:
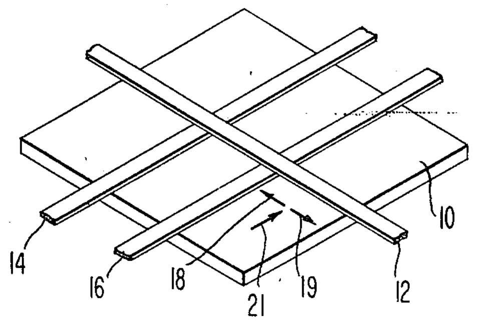
Fig. 1 PRIOR ART
FIGURE 1 is a simplified perspective drawing of a memory element.

In FIGURE 1 a pictorial diagram of a storage element is shown having a thin film of anisotropic ferromagnetic material 10, a word driver conductor 12 in proximity to the ferromagnetic film, a read conductor 14 near said ferromagnetic film and perpendicular to the word drive conductor 12, and a write conductor 16 parallel to the read conductor 14. The arrows 18 and 19 indicate the preferred or "easy" directions of magnetization of the ferromagnetic film 10 and the arrow 21 indicates one of the two possible "hard" directions of magnetization, which are perpendicular to the "easy" directions of magnetization. The direction 18 is arbitrarily taken as a "zero" state of the thin film and the opposite direction 19 is arbitrarily taken as a "one" state of the thin film.

To write a "zero" on the storage element having a thin film 10, a drive current is applied to the word drive conductor 12, which creates a magnetic field in the direction 21 so as to rotate the domains of the ferromagnetic film 10 to that direction. A smaller current is passed through the write conductor 16 from the left-hand side of the conductor to its right-hand side as it is shown in FIGURE 1. This tends to rotate the domains of the ferromagnetic film 10 in the direction of the arrow 18. When the current is terminated in the word drive conductor 12, the magnetic domains in the thin film 10 are oriented in the direction of the arrow 18.

Similarly, to write a "one" in the ferromagnetic storage element, a current is passed through the word drive conductor 12 and through the write conductor 16 from the right-hand side to the left-hand side of this conductor as shown in FIGURE 1. This rotates the magnetic domains in the direction of the arrow 19.

To read from a magnetic storage element the current is passed through the word driver conductor 12 so as to rotate the domains and the ferromagnetic thin film 10 in the direction 21. This induces a voltage in the read conductor 14 the polarity of which depends on the original orientation of the domains in the ferromagnetic film 10. It can be seen from this example that noise is introduced into the read conductor 14 during the write operation due to the current flowing through the write conductor 16. It is desirable to reduce the effect of this noise.

Figure 2:
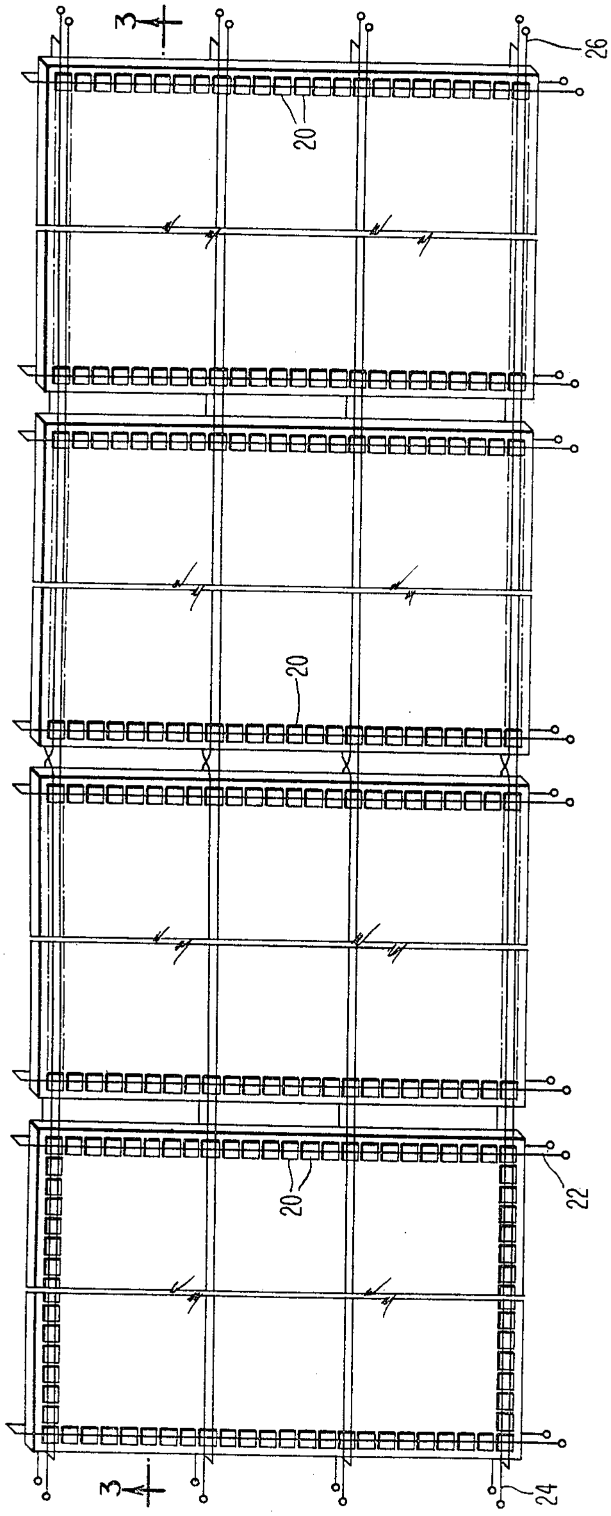
FIGURE 2 is a simplified plan view of a memory plane.

In FIGURE 2 a simplified plan view of a typical thin film memory plane is shown having a plurality of ferromagnetic storage elements 20 in rows and columns deposited on the memory plane. In the simplified drawing of FIGURE 2 only the peripheral ferromagnetic storage elements of four sections of the memory plane are shown. The ferromagnetic thin films such as 20, and transmission lines such as the word drive conductors 22, the read conductors 24, and the write conductors 26, are organized to form a matrix of storage elements. It can be seen that a particular word formed from the states of a series of the ferromagnetic thin films forming one column is selected by passing a current through one of the word drive conductors such as 22. The individual bits making up this word may be written by applying the proper direction current to the write windings such as 26 and the bits forming this word may be read out from the read conductors 24.

Figure 3:
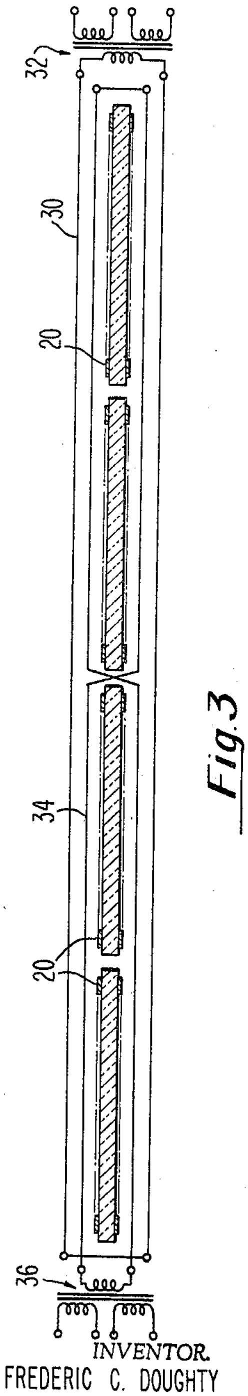
FIGURE 3 is a simplified sectional view of a memory plane taken along lines 3—3 in FIGURE 2.

A simplified cross-sectional view taken along section lines 3—3 of the memory plane in FIGURE 2 is shown in FIGURE 3, having write conductor 30 passing around the plane and being connected to the transformer 32 and having a conductor 34 forming two loops around the memory plane and being connected to the transformer 36.

The write line 30 has two of its four terminals connected across a primary winding of the transformer 32 and has its two conductors on opposite sides of the memory plane stretching to the other side where the other two of its four terminals are connected together as a transmission line termination. On the other hand, the read transmission line has one of its four terminals connected to one side of the primary winding of the transformer 36; has one of its two conductors stretching from this terminal across the top of one-half of the memory plane, passing through its center, and stretching along the bottom of the memory plane to the end farther from the transformer where it is connected to the other conductor of the read transmission line through a termination; and has its other conductor stretching across the top of the memory plane to its center, passing through its center to the bottom of the memory plane, and returning on the bottom of the memory plane to the transformer 36, where it is connected to the other side of its primary winding.

In other words, the write transmission lines on the planar array are arranged so as to be parallel to the read transmission lines. The current flowing through a write line associated with a row of storage elements induces a voltage into the sense line associated with the same row. The two circuits are arranged so that the voltage induced with one polarity along a section of the read line is reduced by an induced voltage of the opposite polarity along another section.

Without a coupling adjustment it may not be possible to achieve a condition where the induced voltages completely negate each other. If one or both of the sections of coupling can be reduced or increased, a perfect cancellation may result.

However, the parallel arrangement of the transmission lines used for the read lines and the write lines provide a convenient technique for adjusting the length of the transmission lines on each side of the memory plane to obtain this near perfect cancellation. Since the transmission lines are four terminal devices, they are each terminated at one end. The terminations of the read lines and the write lines are flexible loops whose geometry and association with the wires connecting to the array is adjustable. The terminations of the read lines are preferably placed on the opposite ends of the planar array from the terminations in the write lines. The interconnections to the write lines and from the read lines are also on opposite sides of the array.

Figure 4:
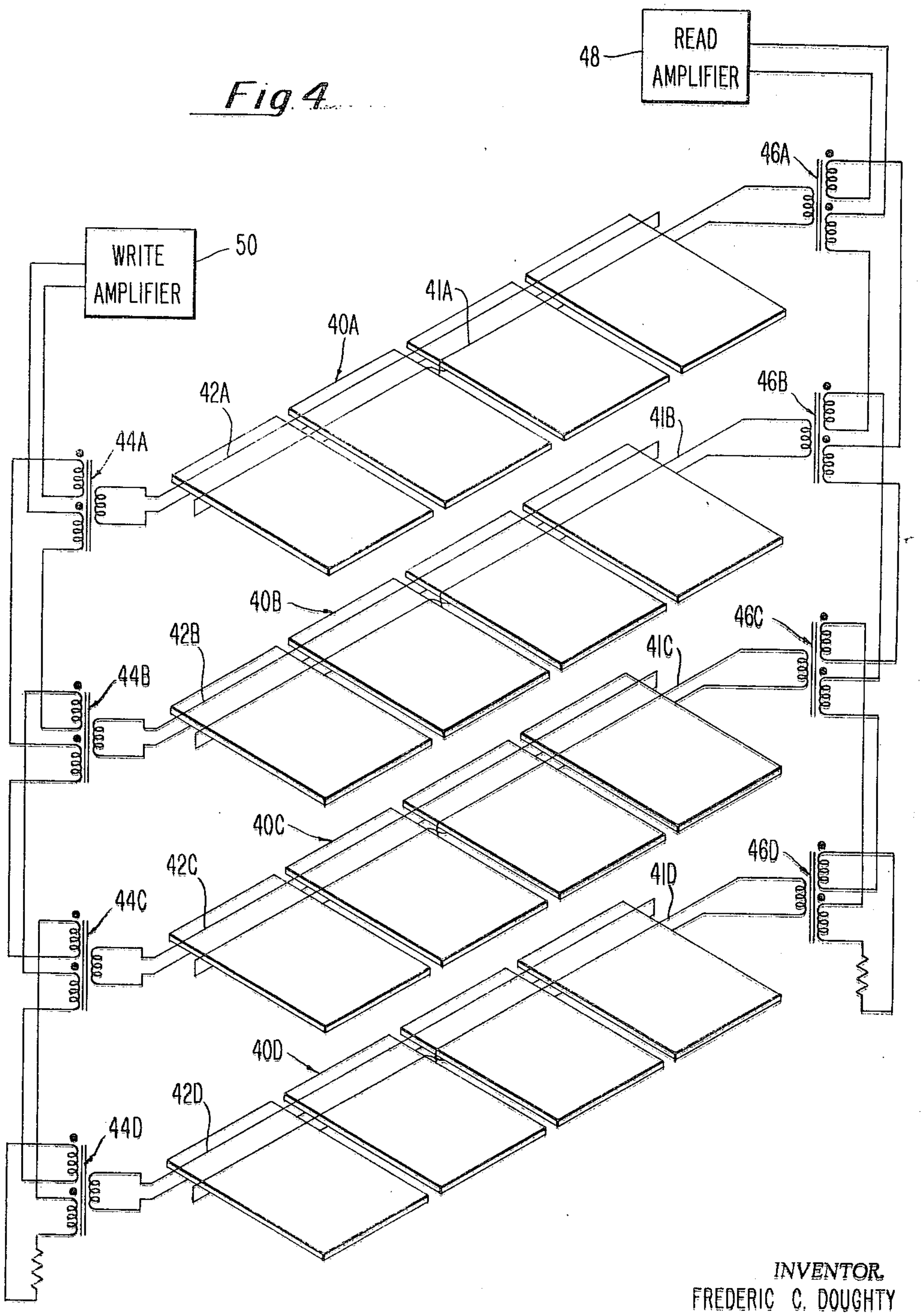
FIGURE 4 is a simplified exploded view of a memory stack embodying the invention.

In FIGURE 4, a simplified pictorial view of a stack of thin film memory planes is shown having four memory planes 40A through 40D. Each of the memory planes 40A–40D has a matrix of thin film memory elements (not shown) deposited upon it and crossed by a word line (not shown), a write line and a read line. In FIGURE 4 only four pairs of write lines 42A–42D and read lines 41A–41D are shown: one pair on each of the corresponding memory planes 40A–40D. Also, one of the four write conductors 42A–42D and one of the four read conductors 41A–41D are wound around a corresponding one of the four memory planes 40A–40D. Although only one row of storage with one write line and one read line are represented in FIGURE 4, it is to be understood that each plane actually includes a plurality of rows, read lines and write lines. The word drive lines which are not shown in FIGURE 4 are perpendicular to the write conductors and the read conductors and cross a column of storage elements which together store one word. One such word on one of the planes of the memory stack is selected at any one time of a selection matrix not shown in FIGURE 4. The column of storage elements comprising the selected word is read out or written into at once so that the storage elements act in parallel. The structure and operation involved is shown in more detail in the copending application of Albert M. Bates, Ser. No. 226,895, filed Sept. 28, 1962, now U.S. Patent No. 3,271,-741, issued Sept. 6, 1966, and assigned to Burroughs Corporation.

It can be seen that at read time one word consisting of a plurality of bits in one of the memory planes is selected and signals are read out in parallel from that plane into a plurality of read amplifiers one of which is 48. If the selected word, for example, is in the memory plane 40B, a signal is introduced in the read conductor 41B. This signal is coupled through the secondary of the transformer 46B to the read amplifier 48 and also to the transformers 46A, 46C and 46D, connected to each of the read lines 41A, 41C and 41D.

Similarly, during write time one word on one plane is selected and the state of the ferromagnetic storage elements is determined by a plurality of write amplifiers one of which is 50. The signals generated by these write amplifiers and coupled to the write lines 42A–42D through transformers 44A–44D introduces noise in each of the read conductors in a plane of the selected word which may be for example a memory plane 40B. In such a case noise is introduced into the conductor 41B. However, this noise is self-cancelling since the conductor 41B is transposed in location with the write conductor 42B. It can be seen that with this arrangement each of the read conductors may be individually "tuned" once the plane is removed so that all of the noise will be self-cancelling. Thus any of the planes 40A–40D with its accompanying windings may be taken out and replaced if it becomes damaged. This does not effect the noise cancelling arrangement even though several windings are in parallel with the windings of the replaced plane with respect to the write amplifiers and the read amplifiers.

Figure 5:
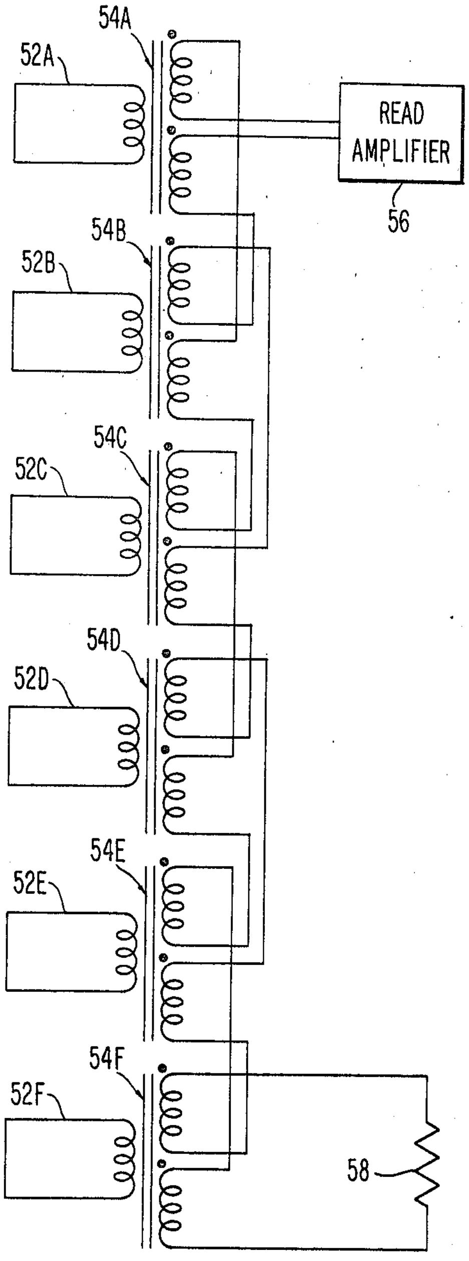
FIGURE 5 is a schematic circuit diagram of an embodiment of the invention.

In FIGURE 5 a schematic circuit diagram of an embodiment of the invention is shown having 6 read conductors 52A–52F, each forming a closed conducting loop including a primary winding of a corresponding one of the transformers 54A–54F. Each of the transformers 54A–54F has two secondary windings of flat bifilar wire wound in the same direction, and has a ratio of 1:2 from its primary to each of the two secondaries.

The end of each secondary winding into which current flows from the winding when current flows in a given direction through the primary winding will hereafter be called the "first" and and the end of each secondary winding from which current flows into the windings themselves when current of the same given direction flows into the primary winding will hereafter be called the "second" end. The first end of one of the secondary windings of transformer 54A and the second end of the other secondary winding of this transformer are electrically connected to the input of the read amplifier 56. The remaining first end of the secondary windings of the transformer 54A is electrically connected to the first end of the secondary windings of the transformer 54B and the other second end of the secondary windings of the transformer 54A is electrically connected to one of the second ends of the transformer 54B. The remaining first end of the transformer 54B is electrically connected to the first end of one of the secondary windings of the transformer 54C and the remaining second end of the secondary windings of transformer 54B is electrically connected to one of the second ends of the secondary windings of the transformer 54C. Transformers 54C, 54D, 54E and 54F are connected one to the other in the same manner, with the remaining first end of the transformer 54F and the remaining second end of the transformer 54F having a terminating resistor 58 electrically connected between them. The resistance 58 is adjusted so as to minimize reflections.

This transformer arrangement permits the individual read conductors 52A–52F to be tuned so as to remove noise. Each conductor may be tuned separately since some of the noise will be cancelled out within its own closed loop. In this way the turning is simpler and a modular construction may be utilized in which any plane may be removed and another substituted for it.

The transformer connection to the read amplifier 56 acts as a distributed delay line. Signals representing a bit of information are periodically generated in one of the read lines 52A–52F. These signals travel up to the read amplifier 56 appearing across the secondary winding of each of the transformers and travel down to the terminating resistor 58 appearing across each of the secondary windings of the transformers in its path.

The signal is delayed in turn by each secondary winding of the series for the period of time it takes for the signal energy transformed to each primary winding to be returned to the secondary. As a signal propagates along the secondary interconnection it initially sees each secondary winding as a high impedance inducing the signal into the respective primary. After a period of time, necessary for this induced signal to travel to the termination of the read line and be reflected back to the primary the value of the termination appears as the load impedance across the primary. This value, a short circuit, is reflected through the turns ratio of the transformer across the secondary windings. The high impedance initially appearing across each secondary winding drops to a very low (near zero) value and near full signal is propagated to the next unit in the series.

Figure 6:
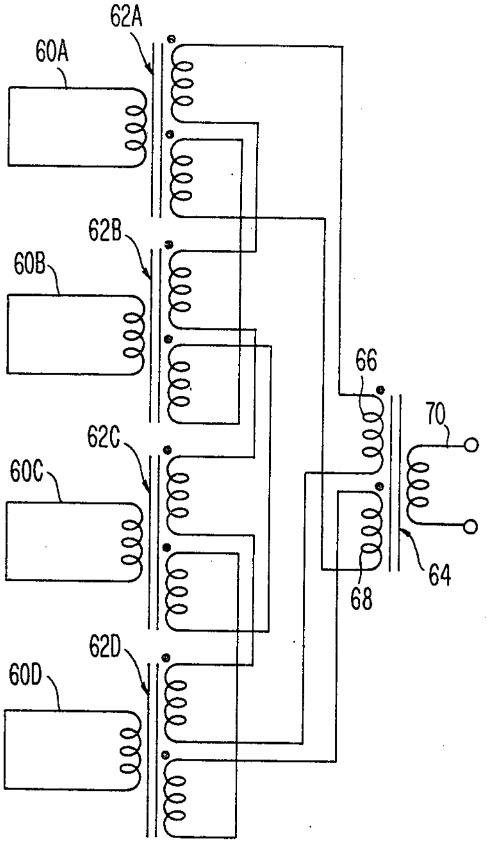
FIGURE 6 is a schematic circuit diagram of another embodiment of the invention.

In FIGURE 6 a schematic diagram of another embodiment of the invention is shown in which both ends of the distributed line formed of the transformer coupling drive the read amplifier rather than one end of the line being terminated and the other end driving the read amplifier as was the case in the embodiment of FIGURE 5. This embodiment sustains some distortion from multipath delays and provides one-half the maximum delay and less attenuation. In FIGURE 6 four read lines 60A–60D are shown, each forming a closed loop with the secondary windings of a corresponding one of the four transformers 62A–62D included in the loop. Each of the transformers 62A–62D have two secondary windings with each of the two secondary windings having a first end into which current flows from the winding whenever current flows in the primary winding of a given direction and a second end into which current flows from the winding when current flows in the primary winding of the opposite direction from said given direction. Each of the transformers has a ratio of 1:2 between the primary winding and each of the secondary windings, having four turns on the primary winding and eight turns on each of the two secondary windings.

A transformer 64, for coupling the sense line transformers to the sensing amplifier, has two four-turn primary windings 66 and 68. The secondary winding 70 of the transformer 64 which is connected to the read amplifier has four turns. The windings 66 and 68 on the transformer 64 each have a first end which induces current into the secondary winding 70 of the transformer 64 in one direction when current flows into that end from the winding, and each has a second end which induces current into the secondary winding 70 in the opposite direction from the given direction when current flows into it from the winding.

The first end of one of the secondary windings on transformer 62A is electrically connected to the first end of the primary winding 66 and the second end of the other secondary winding on transformer 62A is electrically connected to the second end of the primary winding 68. Similarly, the first end of one of the secondary windings of transformer 62D is electrically connected to the first end of the primary winding 68 and the second end of the other secondary winding of transformer 62D is electrically connected to the second end of the winding 66. The other first end of the secondary windings on transformer 62A is electrically connected to one of the second ends of the transformer 62B and the other second end of the secondary windings of the transformer 62A is electrically connected to the first end of the other secondary winding of the transformer 62B. Similarly, the other first end of the secondary windings of the transformer 62D is electrically connected to the second end of one of the secondary windings of the transformer 62C and the other second end of the transformer 62D is electrically connected to the first end of the other secondary windings of the transformer 62C. The remaining first end of the secondary windings of the transformer 62B is electrically connected to the remaining second end of the secondary windings of the transformer 62C and the remaining second end of the secondary windings of transformer 62B is electrically connected to the remaining first end of the secondary windings of the transformer 62C.

It can be seen that the coupling circuit of this invention provides a convenient manner of connecting a plurality of parallel circuits to a single unit and yet provides a system by which each of the parallel circuits may be tuned so as to remove noise generated from a particular location. This enables the parallel circuits to be tuned individually either when connected to the other circuits or on a test fixture prior to such connection. It enables the individual parallel circuits to be interchanged.

Obviously, many modifications and variations of the present invention are possible in the light of the above teachings.

What is claimed is:

1. The combination comprising:

a storage element having a plurality of stable states and being adapted to cooperate with other storage elements in a memory;

write means, in juxtaposition with said storage element, for electrically selecting one of said plurality of stable states;

read means, in juxtaposition with said storage element, for indicating in which of said plurality of stable states said storage element is; and a transformer having a primary winding electrically connected to said read means and secondary winding means;

said write means and said read means having current conducting portions transposed with respect to each other whereby the voltage induced in one of said means by the other is self-cancelling.

2. The combination in accordance with claim 1 in which said transformer comprises:

a primary winding electrically connected to said read means; and two secondary windings wound in the same direction;

each of said secondary windings being adapted to be electrically connected in series with the secondary windings of other transformers and with an input means to a utility device.

3. The combination comprising:

an array of storage elements each having a plurality of stable states;

a plurality of input conducting means for conducting electric current to control said storage elements;

each of said plurality of input conducting means being electrically connected to a different one of said storage elements;

a plurality of output conducting means for conducting electric current which is indicative of the state of said storage elements;

each of said plurality of output conducting means being electrically connected to a different one of said storage elements;

coupling means for selectively coupling said input conducting means to a source of electric potential, and a plurality of transformers and an output circuit;

each of said plurality of transformers having its primary winding electrically connected to a different one of said output conducting means and having two secondary windings each electrically connected in series with a secondary winding of other of said transformers and said output circuit.

4. Apparatus for coupling a plurality of storage elements each having a plurality of stable states in parallel to an output circuit in a noise cancelling relationship comprising:

a plurality of transformers;

a primary winding of each of said transformers being electrically connected to a different one of said storage elements;

each of the transformers having a first secondary winding and a second secondary winding;

all of the first secondary windings of said transformers being electrically connected in series between a first transformer and a last transformer of said plurality of transformers and all of the second secondary windings of said transformers being electrically connected in series between said first transformer and said last transformer;

the remaining ends of said first secondary winding and said second secondary winding of said first transformer being adapted to be connected to said output circuit; and the remaining ends of said first secondary winding and said second secondary winding of said last transformer having a terminating resistance electrically connected between them.

5. Apparatus for coupling a plurality of storage elements each having a plurality of stable states in parallel to an output circuit in a noise cancelling relationship comprising:

a plurality of transformers;

the primary winding of each of said transformers being electrically connected to a different one of said storage elements;

each of said plurality of transformers having a first secondary winding and a second secondary winding;

all of said first secondary windings being electrically connected in series with each other and all of the second secondary windings being electrically connected in series with each other;

an output transformer having a first primary winding, a second primary winding, and a secondary winding;

one end of said first primary winding being electrically connected to one of the remaining ends of said series of first secondary windings and the other end of said first primary winding being electrically connected to the other end of said series of first secondary windings; and one end of said second primary winding being electrically connected to one of the remaining ends of said series of second secondary windings and the other end of said second primary winding being electrically connected to the other end of said series of second secondary windings.

6. The combination comprising:

a storage element having a plurality of stable states and being adapted to cooperate with other storage elements in a memory;

write means, in juxtaposition with said storage element, for electrically selecting one of said plurality of stable states;

read means, in juxtaposition with said storage element, for indicating in which of said plurality of stable states said storage element is;

a plurality of transformers each having a primary winding electrically connected to said read means and each having first and second secondary windings;

said first secondary windings being electrically connected in series and the second secondary windings being electrically connected in series; and output means being electrically coupled to the secondary windings of one of said plurality of transformers;

said write means and said read means having current conducting portions transposed with respect to each whereby the voltage induced in one of said means by the other is self-cancelling.

7. The combination in accordance with claim 6 further comprising:

a plurality of second transformers each having a secondary winding electrically connected to said write means; and two primary windings wound in the same direction;

each of said primary windings being adapted to be electrically connected in series with the corresponding primary windings of other of said second transformers and with a signal input means.

8. The combination comprising:

a plurality of storage elements each having two stable states;

write means, in juxtaposition with said storage elements for electrically selecting one of said stable states;

read means, in juxtaposition with said storage elements, for indicating the present state of said storage elements;

a plurality of transformers each having a primary winding electrically connected to said read means and each having a pair of secondary windings;

each of said secondary windings being electrically connected in series with secondary windings of other of said transformers; and output means being electrically coupled to the secondary windings of one of said plurality of transformers.

9. The combination of claim 8 wherein the series connection of the secondary windings of the transformers is transposed between interconnected ones of said transformers and said output means is responsive to read-out signals of opposite polarities.

10. The combination of claim 8, further comprising:

a plurality of second transformers each having a secondary winding electrically connected to said write means; and two primary windings wound in the same direction;

each of said primary windings being electrically connected in series with primary windings of the other second transformers and with signal input terminal means.

References Cited

UNITED STATES PATENTS 3,402,401 9/1968 Taren ------------- 340—174

BERNARD KONICK, Primary Examiner

S. B. POKOTILOW, Assistant Examiner